UNITED STATES PATENT OFFICE.

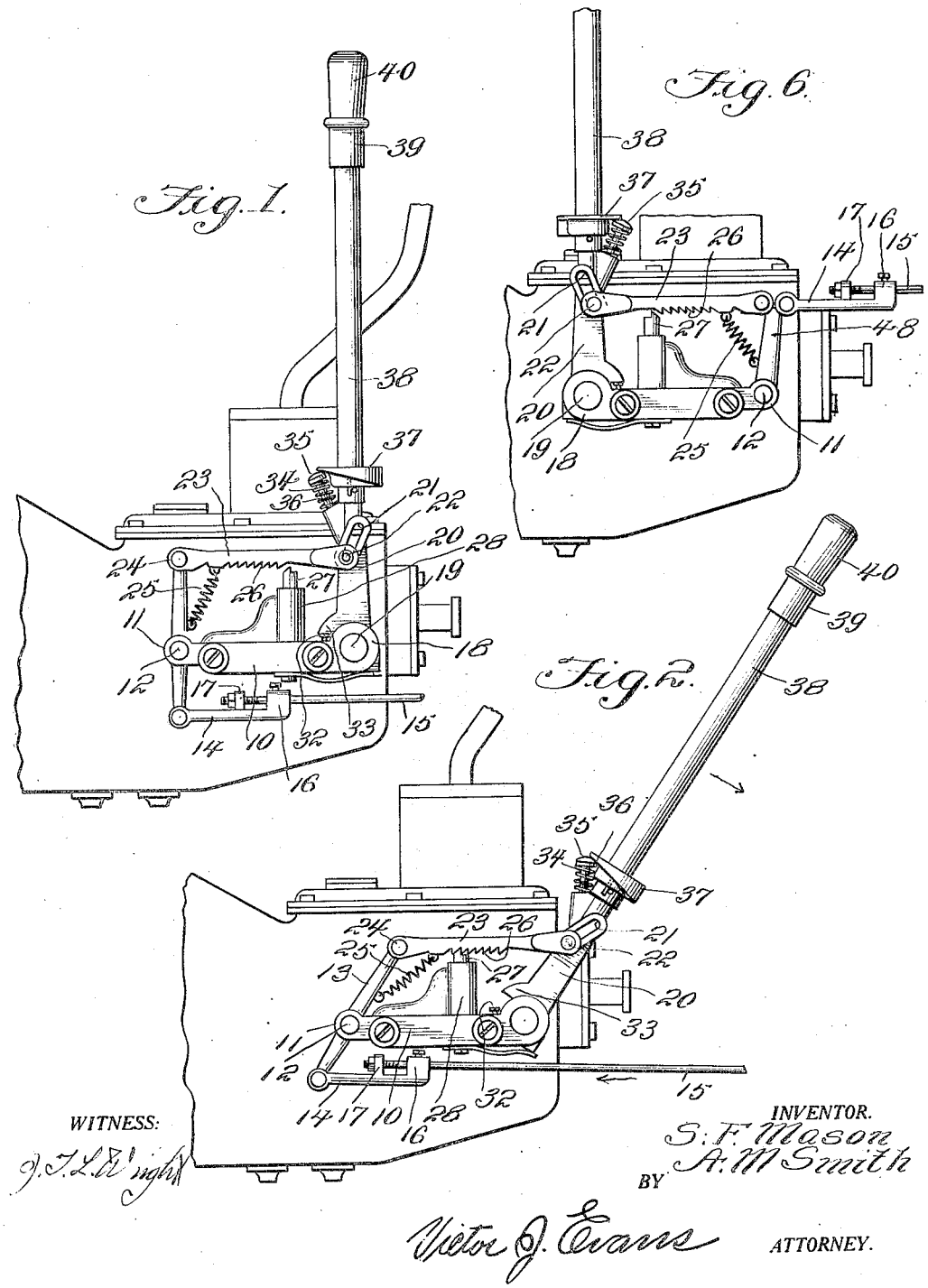

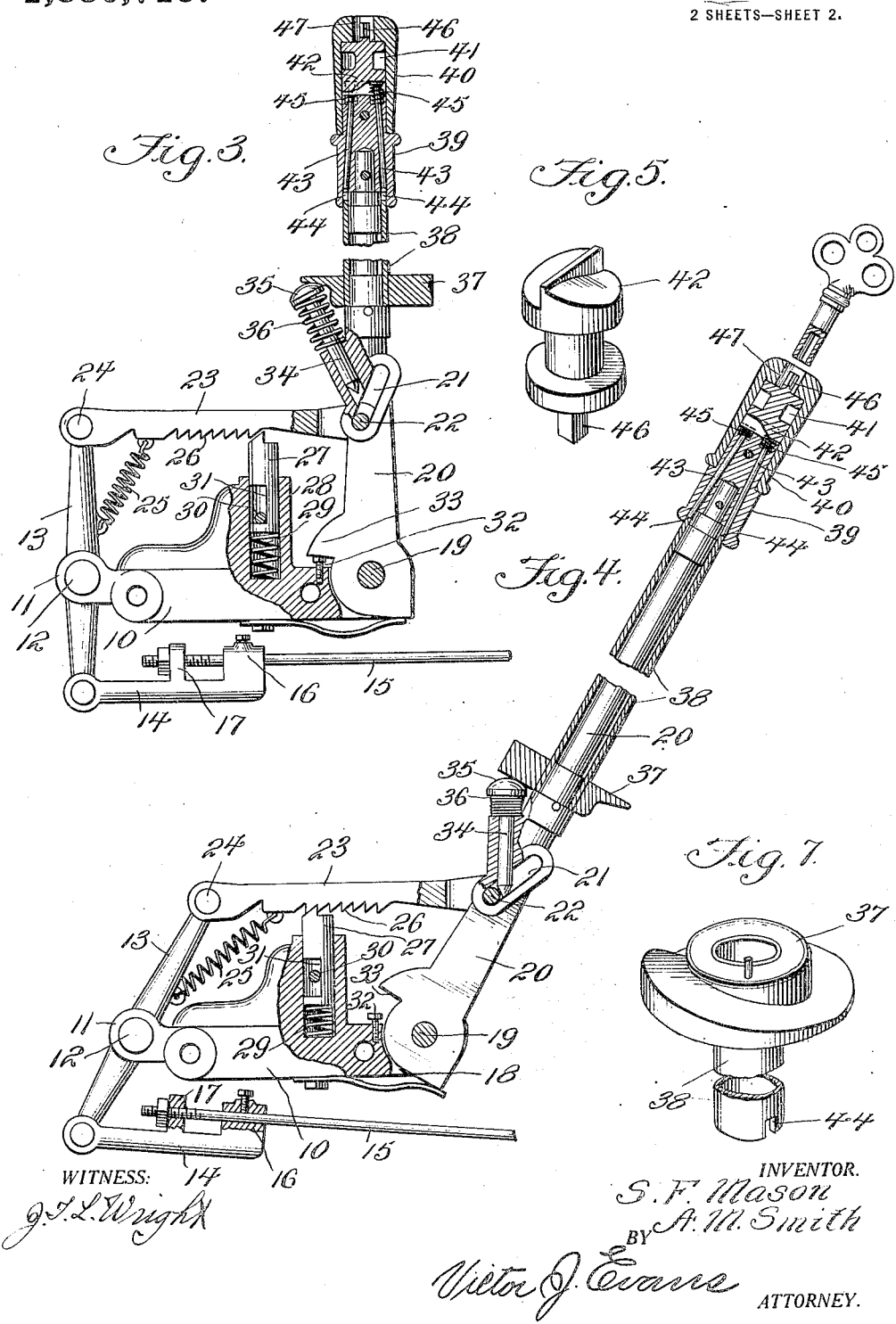

STANLEY F. MASON AND ANDREW M. SMITH, OF PETERSBURG, VIRGINIA.

BRAKE-OPERATING MECHANISM.

1,330,715.   Specification of Letters Patent.   Patented Feb. 10, 1920.

Application filed May 9, 1919. Serial No. 295,846.

*To all whom it may concern:*

Be it known that we, STANLEY F. MASON, and ANDREW M. SMITH, citizens of the United States, residing at Petersburg, in the county of Dinwiddie and State of Virginia, have invented new and useful Improvements in Brake-Operating Mechanism, of which the following is a specification.

This invention relates to improvements in brake mechanisms, the object being to provide novel operating means, whereby the brake controlling lever may be operated to either apply or release the brake without the necessity of manually operating the ratchet operating mechanism.

Another object is to provide means for holding the controlling lever in braking position against accidental misplacement, the said lever remaining in its set position until manually released.

Another object is to provide means for locking the controlling lever in position, so as to prevent its operation by unauthorized persons, thereby preventing the unauthorized operation of the machine to which the invention may be applied.

A further object is to provide a mechanism, including all of the above and many other advantages, which is simple of construction and operation, and which may be used in connection with vehicles of any character, or with various kinds of mechanism.

Other objects and advantages of the invention will appear as the following description is read in connection with the accompanying drawings.

In the drawings:

Figure 1 is a side elevation showing the invention in position, the controlling lever being arranged to operate the brake by a pulling or backward movement.

Fig. 2 is a similar view showing the position of the parts when the brake is applied.

Fig. 3 is a vertical section through the controlling lever with the parts in position, as shown in Fig. 1, that is in normal position.

Fig. 4 is a view similar to Fig. 3, showing the position of the controlling lever when the brake is applied locked against release.

Fig. 5 is a detail perspective view of the cam for locking the brake against operation.

Fig. 6 is a detail side elevation showing the arrangement for applying the brake by a forward or pushing movement of the controlling lever, the parts being in normal position.

Referring to the drawings in detail, like characters of reference denote corresponding parts throughout the several views.

In carrying out the invention, there is provided a bracket 10, which may be suitably secured upon the transmission casing of a motor vehicle, or upon any other convenient part of a vehicle of any character. This bracket comprises a base provided at one end with an eye 11, the latter being adapted to receive a pivot pin 12, for connection with a lever 13. This lever is mounted intermediate its ends upon a pin 12, and the lower end thereof has pivotally connected thereto an arm 14, to which may be adjustably secured one end of a brake rod 15. This rod is suitably connected to vehicle brake bands and is secured to the arm 14, as shown at 16 and 17.

The opposite end of the base 10 is also provided with an eye 18, and pivotally mounted upon a pin 19 and secured within this eye is one end of a controlling lever 20. The controlling lever 20 is provided with an elongated slot 21, which is disposed at an angle with respect to the lever and is adapted to receive a pin 22, the latter being carried by one end of a ratchet link 23. The opposite end of the link 23 is pivotally connected to one end of the lever 13, as indicated at 24, so that one end of this link has a pivotal connection and the opposite end a pivotal sliding connection through the medium of the pin 22 and the slot 21. The link 23 is yieldingly held in the lower end of the slot 21 through the medium of a spring 25, one end of which is connected to the link and the opposite end to the lever 13.

Located in the path of the teeth 26 of the link 23, is a spring detent 27, the latter being mounted in a cylindrical extension 28 of the base 10, and normally urged toward the ratchet link 23 through the medium of a spring 29. Movement of the detent 27 is limited through the medium of a pin 30, which passes through the cylindrical extension 28 and through a notch 31 provided in the detent 27. To properly adjust the controlling lever 20, the base 10 carries an adjusting screw 32, which is engageable with a shoulder 33, formed on the controlling lever.

In the operation of the invention thus far described, when the controlling lever is moved upon its pivot 19, in a direction away from the lever 13, the brake will be applied and the teeth 26 of the link 23 will engage the spring detent 27, so as to prevent accidental reverse movement of the controlling lever, and the brake will be held in its applied position. To release the brake, the lever 20 is swung in a reverse direction, whereupon the pin 22 will ride upward in the slot 21 and the teeth 26 will be released from the detent 27, after which the spring 25 will return the link 23 to its normal position for further operation.

In order to hold the brake in its applied position against accidental release from shock or jar, there is provided a pin 34, one end of which enters the slot 21 and acts to lock the pin 22 in the lower end of the slot. The opposite end of the pin 34 is provided with a head 35, beneath which is positioned a spring 36, which acts to normally force the pin upward out of the slot, so as to permit free movement therein of the pin 22.

The pin 34 is depressed through the medium of a rotatably mounted cam 37, the latter being connected to one end of a sleeve 38, mounted for rotation about the brake controlling lever 20. The upper end of the controlling lever 20 has rigidly connected thereto an extension 39, the latter being in turn connected to a hollow cap 40, the upper end of the extension 39 terminating short of the upper inner slot of the cap. This provides a chamber 41, within which is rotatably mounted a locking cam 42. Mounted in guide openings within the extension 39 are locking pins 43, the lower of these pins being adapted to engage teeth or serrations 44, formed in the upper edge of the sleeve 38. The upper headed ends of the pins 43 extend through the extension 39, and are adapted to be acted upon by the face of the cam 42 in a manner to depress the pins and cause them to engage the teeth or serrations 44, so as to lock the sleeve 38 against rotary movement. The pins 43 are normally forced upward out of engagement with the teeth or serrations 44 through the medium of springs 45. The locking cam 42 is provided with a rectangular extension 46, which extends into an opening 47, provided in the cap 40, so that a socket key may be inserted into this opening for engagement with the extension 46 to operate the cam.

It will thus be seen that by rotating the sleeve 38, the cam 37 may be operated to depress the pin 34 and lock the pin 32 against movement within the slot 21. By then rotating the cam 42 through the medium of a suitable key, the pins 43 may be depressed into engagement with the teeth or serrations 44 and the cam 37 will then be locked against movement. This will prevent the release of the brake by unauthorized persons and the unauthorized operation of the vehicle.

To provide for the use of the mechanism in connection with the brake operating in a reverse direction from that just described, there is provided the construction illustrated in Fig. 6. This differs from that previously described only in substituting the lever 48 for the lever 13. This lever is provided with an eye at each end, one end of the ratchet link 23 being connected to one of these eyes and the arm 14 connected to the other eye.

Various other changes may be made in the form, proportions and minor details of construction and the right is herein reserved to make such changes as properly fall within the scope of the appended claims.

Having described the invention, what is claimed is:

1. The combination with a brake mechanism, of a pivotally slotted controlling lever, a second pivotally mounted lever, means whereby the latter may be connected to a brake rod, a ratchet link pivotally connecting both of said levers and a spring actuated detent located in the path of the ratchet link for engagement therewith to lock the controlling lever in position.

2. The combination with a brake mechanism, of a pivotally mounted controlling lever provided with a cam slot, a second pivotally mounted lever, means whereby the latter may be connected to a brake rod, a spring controlled ratchet link having one end pivotally connected to the second mentioned lever and its opposite end pivotally and slidably connected to the controlling lever through the medium of the cam slot and a spring actuated detent located in the path of the ratchet link and engageable therewith when the controlling lever is moved in one direction and adapted to be released from said detent to the sliding slot connection when said controlling lever is moved in a reverse direction.

3. The combination with a brake mechanism, of a pivotally mounted controlling lever provided with a cam slot, a second pivotally mounted lever, means whereby the latter may be connected to a brake rod, a spring controlled ratchet link having one end pivotally connected to the second mentioned lever and its opposite end pivotally and slidably connected to the controlling lever through the medium of said cam slot, a spring actuated detent located in the path of the ratchet link and engageable therewith when the first mentioned lever is moved in one direction and adapted to be released from said detent through the sliding slot connection when said controlling lever is moved in a reverse direction and means for locking the link against sliding movement in the slot.

4. The combination with a brake mechanism, of a pivotally mounted controlling lever provided with a cam slot, a second pivotally mounted lever, means whereby the latter may be connected to a brake rod, a spring controlled ratchet link having one end pivotally connected to the second mentioned lever and its opposite end pivotally and slidably connected to the controlling lever through the medium of the cam slot, a spring actuated detent located in the path of the ratchet link and engageable therewith when the first mentioned link is moved in one direction and adapted to be released from said detent through the sliding slot connection when said controlling lever is moved in a reverse direction and means including a spring actuated pin operating within the cam slot for locking the link therein against sliding movement.

5. The combination with a brake mechanism, of a pivotally mounted controlling lever provided with a cam slot, a second pivotally mounted lever, means whereby the latter may be connected to a brake rod, a spring actuated ratchet link having one end pivotally connected to the second mentioned lever and its opposite end pivotally and slidably connected to the controlling lever through the medium of the cam slot, a spring actuated detent located in the path of the ratchet link and engageable therewith when the controlling lever is moved in one direction and adapted to be released from said detent through the sliding slot connection when said controlling lever is moved in a reverse direction, means including a spring actuated pin operating within the slot for locking the link therein against sliding movement and means including a rotary element acting upon the spring actuated pin for locking the latter against movement.

6. The combination with a brake mechanism, of a pivotally mounted slotted controlling lever, a second pivotally mounted lever, means whereby the latter may be connected to a brake rod, a ratchet link connected to the second mentioned lever, a pin carried by the opposite end of said link for pivotal and sliding engagement within the slot of the controlling lever, a spring actuated detent located in the path of the ratchet link for engagement therewith to lock the controlling lever in position, a spring actuated pin mounted upon said controlling lever and operating within the slot to lock the ratchet link against sliding movement and a cam mounted upon the first mentioned lever for operating the spring actuated pin and holding the same in locking position.

7. The combination with a brake mechanism, of a pivotally mounted slotted controlling lever, a second pivotally mounted lever, means whereby the latter may be connected to a brake rod, a ratchet link having one end pivotally connected to the second mentioned lever, a pin carried by the opposite end of said link for pivotal and sliding engagement within the slot of the controlling lever, a spring actuated detent located in the path of the ratchet link for engagement therewith to lock the controlling lever in position, a spring actuated pin mounted upon said controlling lever and operating within the slot to lock the ratchet link against sliding movement, a cam mounted upon the controlling lever for operating the spring actuated pin and holding the same in locking position and means for locking the cam against movement.

8. The combination with a brake mechanism, of a pivotally mounted slotted controlling lever, a second pivotally mounted lever, means whereby the latter may be connected to a brake rod, a ratchet link having one end pivotally connected to the second mentioned lever, a pin carried by the opposite end of said link for pivotal and sliding engagement within the slot of the controlling lever, a spring actuated detent located in the path of the ratchet link for engagement therewith to lock the controlling lever in position, a spring actuated pin mounted upon said controlling lever and operating within the slot to lock the ratchet link against sliding movement, a cam mounted upon the controlling lever for operating the spring actuated pin and holding the same in locking position and means including a rotatable element for locking the cam against movement.

9. The combination with a brake mechanism, of a pivotally mounted slotted controlling lever, a second pivotally mounted lever, means whereby the latter may be connected to a brake rod, a ratchet link having one end pivotally connected to the second mentioned lever, a pin carried by the opposite end of said link for pivotal and sliding engagement within the slot of the controlling lever, a spring actuated detent located in the path of the ratchet link for engagement therewith to lock the controlling lever in position, a spring actuated pin mounted upon said controlling lever and operating within the slot to lock the ratchet link against sliding movement, a cam mounted upon the controlling lever for operating the spring actuated pin and holding the same in locking position and means including spring actuated pins located within the handle of the controlling lever and acted upon by a rotatable element for locking the cam against movement.

In testimony whereof we affix our signatures.

STANLEY F. MASON.
ANDREW M. SMITH.